United States Patent
Zeng et al.

(10) Patent No.: US 11,778,300 B2
(45) Date of Patent: Oct. 3, 2023

(54) DISPLAY DEVICE AND WHITE BALANCE ADJUSTING METHOD OF PHOTOSENSITIVE ELEMENT OF DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Tao Zeng, Hubei (CN); Yang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 296 days.

(21) Appl. No.: 17/275,524

(22) PCT Filed: Feb. 24, 2021

(86) PCT No.: PCT/CN2021/077703
§ 371 (c)(1),
(2) Date: Mar. 11, 2021

(87) PCT Pub. No.: WO2022/160398
PCT Pub. Date: Aug. 4, 2022

(65) Prior Publication Data
US 2023/0097674 A1    Mar. 30, 2023

(30) Foreign Application Priority Data
Jan. 28, 2021    (CN) .......................... 202110118384.7

(51) Int. Cl.
*G09G 5/04*    (2006.01)
*H04N 23/57*    (2023.01)
*H04N 23/88*    (2023.01)

(52) U.S. Cl.
CPC .............. *H04N 23/57* (2023.01); *G09G 5/04* (2013.01); *H04N 23/88* (2023.01); *G09G 2320/0666* (2013.01)

(58) Field of Classification Search
CPC ...... G09G 5/02; G09G 3/2003; G09G 3/3607; H04N 23/88; H04N 9/3182; H04N 9/73
See application file for complete search history.

(56) References Cited

U.S. PATENT DOCUMENTS 8,164,649 B2 *  4/2012  Abe ................. H04N 1/6077
                                                 348/223.1
9,483,849 B2 * 11/2016  Choi ................... H04N 23/71
(Continued)

FOREIGN PATENT DOCUMENTS

CN    102685513 A    9/2012
CN    108419067 A    8/2018
(Continued)

*Primary Examiner* — Kevin M Nguyen (57) ABSTRACT

A display device and a white balance adjusting method of a photosensitive element of the display device are provided. The display device includes a display panel, the photosensitive element, and a driver integrated circuit (IC). A first white balance imaging parameter is color parameters of a preset image collected by the photosensitive element of the display device under a preset light source. A second white balance imaging parameter is color parameters of a preset image collected by a photosensitive element of a typical display device under the preset light source. The driver IC is configured to perform a white balance compensation on image data collected by the photosensitive element of the
(Continued)

calculating the deviation between the first white balance imaging parameter and the second white balance imaging parameter by the driver IC — S1 calculating the base deviation between the first white balance imaging parameter and the second white balance imaging parameter according to the deviation between the first white balance imaging parameter and the second white balance imaging parameter by the driver IC — S2 performing the white balance compensation on the image data collected by the photosensitive element by the driver IC — S3 display device according to a deviation between the first white balance imaging parameter the second white balance imaging parameter.

20 Claims, 2 Drawing Sheets

(56) References Cited

U.S. PATENT DOCUMENTS

2008/0055339 A1* 3/2008 Chao .................... G09G 3/2003
  345/690
2019/0253683 A1 8/2019 Zhu et al.

FOREIGN PATENT DOCUMENTS

CN 112004077 A 11/2020
KR 20100050030 A 5/2010

* cited by examiner

DISPLAY DEVICE AND WHITE BALANCE ADJUSTING METHOD OF PHOTOSENSITIVE ELEMENT OF DISPLAY DEVICE

BACKGROUND OF INVENTION

Field of Invention

The present disclosure relates to the field of display technology, and specifically to a display device and a white balance adjusting method of a photosensitive element of the display device.

Description of Prior Art

With increasingly mature under-screen display technology, call for full screens is rising up. Currently, imaging technology of placing a photosensitive element under a screen (such as an under-screen camera) is affected by a transmittance rate and diffraction of organic light emitting diode (OLED) screens, so its imaging quality is low, and there are problems such as blurriness, poor color consistency, etc. Due to individual differences during manufacturing, a ratio of a red light intensity component to a green light intensity component (R/G) and a ratio of a blue light intensity component to the green light intensity component (B/G) stored in a photosensitive chip of a photosensitive element will cause actual R/G and B/G to not be consistent with the original values. After finished product of photosensitive element are assembled, due to influence of optical devices such as filters, etc., difference between the ratio of R/G and B/G between individuals are further increased. In a situation that the photosensitive element is used under the screen, due to influence of a difference of transmittance rates between individual OLED screens, the entire difference is further increased, and debugging of mobile phone terminals are generally not able to achieve good white balance color consistency currently.

Therefore, an all new solution is needed to deal with the problem of white balance and color consistency incurred by the technology of disposing the photosensitive under the screen.

SUMMARY OF INVENTION

The present disclosure provides a display device and a white balance adjusting method of a photosensitive element of the display device, which allows to solve the problem of poor white balance color consistency incurred by disposing the photosensitive under the screen in the prior art.

In order to solve the problems mentioned above, the present disclosure provides following technical solutions.

One embodiment of the present disclosure provides a display device, including a display panel, a photosensitive element disposed on a side of the display panel, and a driver integrated circuit (IC) electrically connected to the display panel and the photosensitive element.

The driver IC is configured to perform a white balance compensation on image data collected by the photosensitive element of the display device according to a deviation between a first white balance imaging parameter of the photosensitive element of the display device and a second white balance imaging parameter of a photosensitive element of a preset typical display device.

Wherein, the first white balance imaging parameter is color parameters of a preset image collected by the photosensitive element of the display device under a preset light source.

The typical display device is one sample display device of a preset number of sample display devices selected from a batch of display devices, and a first white balance imaging parameter of the typical display is within a preset threshold value of an average of all first white balance imaging parameters of the preset number of the sample display devices.

The second white balance imaging parameter is color parameters of a preset image collected by the photosensitive element of the typical display device under the preset light source.

Optionally, in several embodiments of the present disclosure, the driver IC is configured to perform white balance compensation on images collected by the photosensitive element according to a following formula:

white balance compensation=second white balance imaging parameter/first white balance imaging parameter/base deviation between the first white balance imaging parameter and the second white balance imaging parameter.

Optionally, in several embodiments of the present disclosure, the color parameters include red parameters, green parameters, and blue parameters. The deviation between the first white balance imaging parameter and the second white balance imaging parameter comprises a first deviation between the red parameters, a second deviation between the blue parameters, and a third deviation between the green parameters. The base deviation is a smallest value among the first deviation, the second deviation, and the third deviation.

Optionally, in several embodiments of the present disclosure, the first white balance imaging parameter includes: a ratio value of the red parameters to the green parameters, a ratio value of the blue parameters to the green parameters, and a ratio value of the green parameters to the green parameters of the preset image collected by the photosensitive element of the display device under the preset light source.

The second white balance imaging parameter includes: a ratio value of the red parameters to the green parameters, a ratio value of the blue parameters to the green parameters, and a ratio value of the green parameters to the green parameters of the preset image which are collected by the photosensitive element of the typical display device under the preset light source.

Wherein, the ratio value of the red parameter and the green parameter, the ratio value of the blue parameter to the green parameter, and the ratio value of the green parameter to the green parameter of the preset image collected by the photosensitive element of the display device under the preset light source are respectively a first ratio value, a second ratio value, and a third ratio value.

The ratio value of the red parameter to the green parameter, the ratio value of the blue parameter to the green parameter, and the ratio value of the green parameter to the green parameter of the preset image collected by the photosensitive element of the typical display device under the preset light source are respectively a fourth ratio value, a fifth ratio value, and a sixth ratio value.

Optionally, in several embodiments of the present disclosure, the driver IC is further configured to calculate the deviation between the first white balance imaging parameter and the second white balance imaging parameter according to following formulas:

first deviation=fourth ratio value/first ratio value;
second deviation=fifth ratio value/the second ratio value; and
third deviation=sixth ratio value/third ratio value.

Optionally, in several embodiments of the present disclosure, a value of the third deviation is 1.

The driver IC is configured to adopt 1 as the base deviation when at least one of the first deviation or the second deviation is greater than or equal to 1, or The driver IC is configured to adopt a smallest one between the first deviation and the second deviation as the base deviation when the first deviation and the second deviation are less than 1.

Optionally, in several embodiments of the present disclosure, the driver IC is further configured to perform the white balance compensation on the images collected by the photosensitive element according to a red-light intensity compensation value, a blue-light intensity compensation value, and a green-light intensity compensation value. Wherein the driver IC is configured to calculate the red-light intensity compensation value, the blue-light intensity compensation value, and the green-light intensity compensation value according to following formulas:

red-light intensity compensation value=fourth ratio value/first ratio value/base deviation;
blue-light intensity compensation value=fifth ratio value/second ratio value/base deviation; and
green-light intensity compensation value=sixth ratio value/third ratio value/base deviation.

Optionally, in several embodiments of the present disclosure, a storage module is further included. The storage module is electrically connected to the driver IC and is configured to store the second white balance imaging parameter of the photosensitive element of the preset typical display device and the first white balance imaging parameter of the photosensitive element of the display device.

Optionally, in several embodiments of the present disclosure, a value range of the preset threshold value is ±3% of the average value of all the first white balance imaging parameters of the preset number of the sample display devices.

Optionally, in several embodiments of the present disclosure, and in the preset number of the sample display devices, when there are more than two sample display devices in which first white balance imaging parameters are within the preset threshold of the average value of all the first white balance imaging parameters of the preset number of the sample display devices, the typical display device is any one of the two or more of the sample display devices.

In order to solve the aforesaid technical problem, the present disclosure further provides a white balance adjusting method of a photosensitive element of the display device. The display device includes a display panel, a photosensitive element disposed on a side of the display panel, and a driver integrated circuit (IC) electrically connected to the display panel and the photosensitive element. Wherein, the white balance adjusting method of the photosensitive element includes following steps:

performing a white balance compensation on image data collected by the photosensitive element of the display device according to a deviation between a first white balance imaging parameter of the photosensitive element of the display device and a second white balance imaging parameter of a photosensitive element of a preset typical display device by the driver IC.

Wherein, the first white balance imaging parameter is color parameters of a preset image collected by the photosensitive element of the display device under a preset light source.

The typical display device is a sample display device of a preset number of sample display devices selected from a batch of display devices, and the first white balance imaging parameter of the sample display device is within a preset threshold value of an average of all first white balance imaging parameters of the preset number of the sample display devices.

The second white balance imaging parameter is color parameters of a preset image collected by the photosensitive element of the typical display device under the preset light source.

Optionally, in several embodiments of the present disclosure, the driver IC is configured to perform white balance compensation on images collected by the photosensitive element according to a following formula: white balance compensation=second white balance imaging parameter/first white balance imaging parameter/base deviation between the first white balance imaging parameter and the second white balance imaging parameter.

Optionally, in several embodiments of the present disclosure, the color parameters include red parameters, green parameters, and blue parameters. The deviation between the first white balance imaging parameter and the second white balance imaging parameter includes a first deviation between the red parameters, a second deviation between the blue parameters, and a third deviation between the green parameters. The base deviation is a smallest value among the first deviation, the second deviation, and the third deviation.

Optionally, in several embodiments of the present disclosure, the first white balance imaging parameter includes: a ratio value of the red parameters to the green parameters, a ratio value of the blue parameters to the green parameters, and a ratio value of the green parameters to the green parameters of the preset image collected by the photosensitive element of the display device under the preset light source.

The second white balance imaging parameter includes: a ratio value of the red parameters to the green parameters, a ratio value of the blue parameters to the green parameters, and a ratio value of the green parameters to the green parameters of the preset image collected by the photosensitive element of the typical display device under the preset light source.

Wherein, the ratio value of the red parameter to the green parameter, the ratio value of the blue parameter to the green parameter, and the ratio value of the green parameter to the green parameter of the preset image collected by the photosensitive element of the display device under the preset light source are respectively a first ratio value, a second ratio value, and a third ratio value.

The ratio value of the red parameter to the green parameter, the ratio value of the blue parameter to the green parameter, and the ratio value of the green parameter to the green parameter of the preset image collected by the photosensitive element of the typical display device under the preset light source are respectively a fourth ratio value, a fifth ratio value, and a sixth ratio value.

Optionally, in several embodiments of the present disclosure, before the driver IC performs the white balance compensation on the images collected by the photosensitive element, the white balance adjusting method of the photosensitive element of the display device includes a following step:

the driver IC calculates the deviation between the first white balance imaging parameter and the second white balance imaging parameter according to following formulas:

first deviation=fourth ratio value/first ratio value;

second deviation=fifth ratio value/the second ratio value; and third deviation=sixth ratio value/third ratio value.

Optionally, in several embodiments of the present disclosure, a value of the third deviation is 1, before the driver IC performs the white balance compensation on the images collected by the photosensitive element and after the driver IC has calculated the first deviation, the second deviation, and the third deviation, the white balance adjusting method of the photosensitive element of the display device includes a following step:

adopting 1 as the base deviation by the driver IC when at least one of the first deviation or the second deviation is greater than or equal to 1, or adopting a smallest one between the first deviation and the second deviation as the base deviation by the driver IC when the first deviation and the second deviation are less than 1.

Optionally, in several embodiments of the present disclosure, the step of the driver IC performing the white balance compensation on the images collected by the photosensitive element includes:

calculating a red-light intensity compensation value, a blue-light intensity compensation value, and a green-light intensity compensation value and performing the white balance compensation on the images collected by the photosensitive element according to the red-light intensity compensation value, the blue-light intensity compensation value, and the green-light intensity compensation value by the driver IC.

Optionally, in several embodiments of the present disclosure, the driver IC calculates the red-light intensity compensation value, the blue-light intensity compensation value, and the green-light intensity compensation value according to following formulas:

red-light intensity compensation value=fourth ratio value/first ratio value/base deviation;

blue-light intensity compensation value=fifth ratio value/second ratio value/base deviation; and green-light intensity compensation value=sixth ratio value/third ratio value/base deviation.

Optionally, in several embodiments of the present disclosure, a value range of the preset threshold value is ±3% of the average value of all the first white balance imaging parameters of the preset number of the sample display devices.

Optionally, in several embodiments of the present disclosure, and in the preset number of the sample display devices, when there are more than two sample display devices in which first white balance imaging parameters are within the preset threshold of the average value of all the first white balance imaging parameters of the preset number of the sample display devices, the typical display device is any one of the two or more of the sample display devices.

The beneficial effect of the present disclosure is that in the present disclosure, the driver IC performs the white balance compensation on the image data collected by the photosensitive element of the display device according to the deviation between the first white balance imaging parameter of the photosensitive element in the display device and the second white balance imaging parameter of the photosensitive element of the typical display device after assembling the photosensitive element and the display panel; wherein, the first white balance imaging parameter is color parameters of a preset image collected by the photosensitive element of the display device under a preset light source, the typical display device is a sample display device of a preset number of sample display devices selected from a batch of display devices, and the first white balance imaging parameter of the sample display device is within a preset threshold value of an average of all first white balance imaging parameters of the preset number of the sample display devices, and the second white balance imaging parameter is color parameters of a preset image collected by the photosensitive element of the typical display device under the preset light source. By the method mentioned above, the present disclosure allows to perform the white balance compensation on an entire batch of the photosensitive elements assembled in the display device, thereby solving the problem of poor white balance color consistency incurred by disposing the photosensitive under the screen in the prior art.

DESCRIPTION OF DRAWINGS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which figures those skilled in the art can derive further figures without making any inventive efforts.

DETAILED DESCRIPTION OF PREFERRED EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, and are not all embodiments of the present disclosure. All other embodiments obtained by those skilled in the art based on the embodiments of the present disclosure without creative efforts are within the scope of the present disclosure. Besides, it should be understood that the specific embodiments described herein are merely for describing and explaining the present disclosure and are not intended to limit the present disclosure. In the present disclosure, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

After entering an era of full screens, with popularity of full screens, waterfall screens and all-around screens, screen-to-body ratios of surfaces of display devices or electronic equipment are increasingly larger. Placing cameras under the screens allows competitiveness of the display devices or electronic equipment in appearance to be greatly enhanced.

Figure 1:
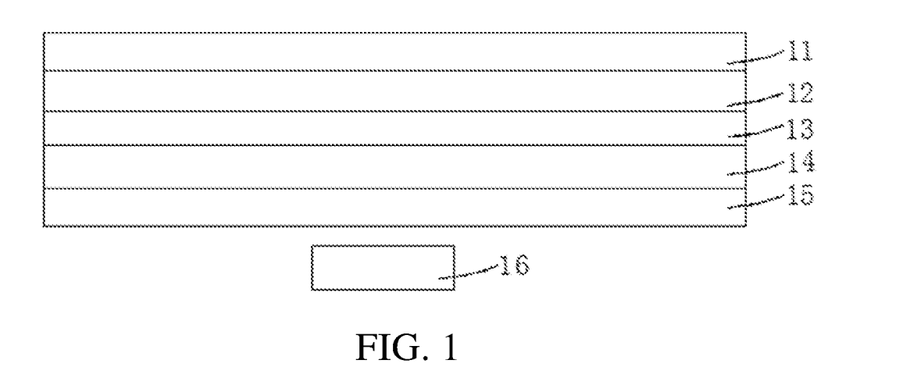
FIG. 1 is a structural schematic diagram of a display device with an under-screen camera in the prior art.

A structure of placing a camera under a screen is illustrated as FIG. 1. Light entering the camera needs to pass through an organic light emitting diode (OLED) screen. For example, from top to bottom, layers that after the light enters the camera and passes through are a cover layer 11, a polarization layer 12, a touch layer 13, an encapsulation layer 14, and an OLED display layer 15, and the light finally reaches the camera 16. Wherein, each of the cover layer 11, the polarization layer 12, the touch layer 13, the encapsulation layer 14, and the OLED display layer 15 further includes a complex structure with 1-20 layers, such as various organic layers, inorganic layers, and optically clear adhesive (OCA) layers, etc. Therefore, intensity of the light that actually reaches the camera after being absorbed and reflected by multiple layers is greatly reduced. Actually, a value sensed by the camera can have a lot of background noise, that is, accuracy of light intensity sensed by the camera is low. Meanwhile, in a situation of using the camera under the screen, due to influence of difference from transmittance rates between individuals of the OLED screens, overall difference is further increased, resulting in the problem of poor white balance color consistency of the under-screen cameras in a batch of display devices.

One embodiment of the present disclosure provides a display device and a white balance adjusting method of a photosensitive element of the display device which is able to solve the aforesaid technical problems. For specific details please refer to the following embodiments. It should be noted that a description order of the following embodiments is not intended to limit a preferred order of the embodiments.

It should be understood that an execution subject of the embodiments of the present disclosure can be an electronic device such as a smart phone, or a tablet computer, etc.

Figure 2:
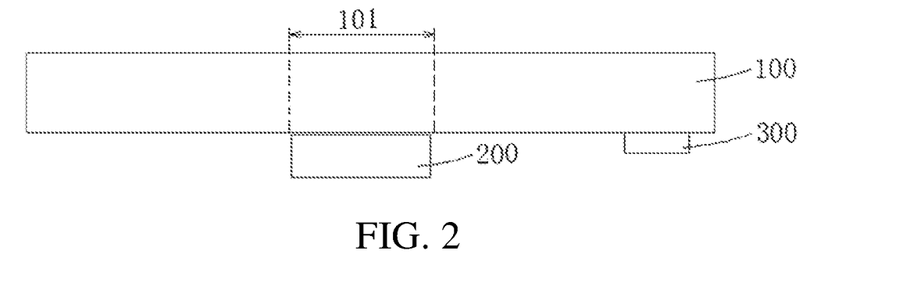
FIG. 2 is a structural schematic diagram of a display device provided by one embodiment of the present disclosure.

Illustrated in FIG. 2 is a structural schematic diagram of the display device provided by the present disclosure. The display device includes a display panel 100, a photosensitive element 200 disposed on a side of the display panel 100, and a driver integrated circuit (IC) 300 electrically connected to the display panel 100 and the photosensitive element 200. Wherein, the display panel 100 includes but is not limited to an organic light emitting diode display panel, a liquid crystal display panel, or a quantum dot display panel, etc. The photosensitive element 200 includes but is not limited to a camera module, etc. The photosensitive element 200 can collect image data through the display panel 100.

Wherein, the display panel 100 includes a photosensitive region 101. The photosensitive element 200 is assembled under the display panel 100 and corresponds to a position of the photosensitive region 101. The position of the driver IC 300 is not limited, and the driver IC can be bonded on the display panel 100. The driver IC 300 is configured to perform a white balance compensation on the image data collected by the photosensitive element 200 of the display device according to a deviation between a first white balance imaging parameter of the photosensitive element 200 of the display device and a second white balance imaging parameter of a photosensitive element 200 of a preset typical display device.

Wherein, the first white balance imaging parameter is color parameters of a preset image collected by the photosensitive element 200 of the display device under a preset light source.

The typical display device is one sample display device of a preset number of sample display devices selected from a batch of display devices, and a first white balance imaging parameter of the typical display is within a preset threshold value of an average of all first white balance imaging parameters of the preset number of the sample display devices.

The second white balance imaging parameter is color parameters of a preset image collected by the photosensitive element 200 of the typical display device under the preset light source.

In this embodiment, each of the display devices of the batch includes the display panel 100, the photosensitive element 200, and the driver IC 300. Wherein, the display devices of the batch can be display devices with display panels 100 of a same lot, or can be display devices with photosensitive elements 200 of a same lot, or can be display devices with display panels 100 of a same lot and photosensitive elements 200 of a same lot, or can be display devices assembled by display panels 100 and photosensitive elements 200 of a same lot.

In the preset number of the sample display devices, the preset number can be determined according to the number of the display devices of the batch of the display devices. For example, the preset number can be ½, ⅓, ¼, ⅕, ⅙, ⅐, ⅛, etc. of the number of the display devices of the batch of the display devices. Moreover, the sample display devices of the preset number are randomly selected from the entire batch of the display devices.

Wherein, a value range of the preset threshold value is ±3% of the average value of all the first white balance imaging parameters of the preset number of the sample display devices, but it is not limited thereto, and the specific value range can be determined according to actual manufacturing process.

Wherein in the preset number of the sample display devices, when there are more than two sample display devices in which first white balance imaging parameters are within the preset threshold of the average value of all the first white balance imaging parameters of the preset number of the sample display devices, the typical display device is any one of the two or more of the sample display devices. Preferably, the display device with the first white balance imaging parameter closest to the average value of the first white balance imaging parameters can be selected as the typical display device.

By the method mentioned above, the present disclosure allows to perform the white balance compensation on an entire batch of the photosensitive elements of the display device. Because the white balance compensation is performed after the photosensitive element is assembled on the display panel, the problem of poor white balance color consistency of the photosensitive elements incurred by the influence of the transmittance rates between individual screens can be solved.

The driver IC 300 performing the white balance compensation on the image data collected by the photosensitive element 200 in the display device of this embodiment is described in detail as follow.

In this embodiment, the white balance compensation is performed under a white light source. The white light can penetrate through the display panel 100 to enter the photosensitive element 200. The display device further includes a storage module (not shown in the figure). The storage module is electrically connected to the driver IC 300 and is configured to store the second white balance imaging parameter of the photosensitive element 200 of the preset typical display device and the first white balance imaging parameter of the photosensitive element 200 of the display device. Wherein, the first white balance imaging parameter includes a ratio value of the red parameters to the green parameters (R/G value), a ratio value of the blue parameters to the green parameters (B/G value), and a ratio value of the green parameters to the green parameters (G/G value) of the preset image collected by the photosensitive element 200 of the display device under the preset light source, that are, unit R/G, unit B/G, and unit G/G. The second white balance imaging parameter includes a R/G value, a B/G value, and a G/G value of the preset image collected by a photosensitive element 200 of the typical display device under the preset light source, that are, typical R/G, typical B/G, and typical G/G. Specifically, the storage module stores unit R/G, unit B/G, unit G/G, typical R/G, typical B/G, and typical G/G.

Wherein, the ratio value of the red parameter to the green parameter, the ratio value of the blue parameter to the green parameter, and the ratio value of the green parameter to the green parameter of the preset image collected by the photosensitive element 200 of the display device under the preset light source are a first ratio value, a second ratio value, and a third ratio value, respectively. The ratio value of the red parameter to the green parameter, the ratio value of the blue parameter to the green parameter, and the ratio value of the green parameter to the green parameter of the preset image collected by the photosensitive element of the typical display device under the preset light source are a fourth ratio value, a fifth ratio value, and a sixth ratio value, respectively.

The photosensitive element 200 of the display device can collect color parameters of the preset image under white light according to the first white balance imaging parameter. The color parameters include red parameters (R), green parameters (G), and blue parameters (B).

Wherein, the photosensitive element 200 can collect the red parameters, the green parameters, and the blue parameters of the preset image under the white light source to obtain a corresponding image. The "parameter" herein can be a parameter that can characterize colors such as light intensity component, for example, the red parameter may be a red-light intensity component. Wherein, the R/G value is a ratio of the red parameter to the green parameter of the preset image collected by the photosensitive element 200; the B/G value is a ratio of the blue parameter to the green parameter of the preset image collected by the photosensitive element 200; and the G/G value is a ratio of the green parameter to the green parameter of the preset image collected by the photosensitive element 200, that is, the G/G value is 1. In this embodiment, the green parameter of the preset image collected by the photosensitive element 200 is a constant value, and the white balance compensation is performed in a form of the ratio between R, G, and B by calculating the ratios of the red parameter to the green parameter and the blue parameter to the green parameter.

Specifically, the driver IC 300 is further configured to perform the white balance compensation on images collected by the photosensitive element 200 according to a following formula:

white balance compensation=second white balance imaging parameter/first white balance imaging parameter/base deviation between the first white balance imaging parameter and the second white balance imaging parameter.

Wherein, the deviation between the first white balance imaging parameter and the second white balance imaging parameter includes a first deviation (R1) between the red parameters, a second deviation (B1) between the blue parameters, and a third deviation (G1) between the green parameters. The base deviation is a smallest value among the first deviation, the second deviation, and the third deviation.

Furthermore, the driver IC 300 is further configured to calculate the deviation between the first white balance imaging parameter and the second white balance imaging parameter according to following formulas:

first deviation=fourth ratio value/first ratio value;

second deviation=fifth ratio value/the second ratio value; and third deviation=sixth ratio value/third ratio value.

Wherein, the third deviation is 1, and the driver IC 300 is configured to adopt 1 as the base deviation when at least one of the first deviation or the second deviation is greater than or equal to 1, or the driver IC 300 is also configured to adopt the smallest one between the first deviation and the second deviation as the base deviation when the first deviation and the second deviation are less than 1.

The aforesaid calculation process of the driver IC 300 can be executed by reading the following codes and parameters (including the first white balance parameter and the second white balance parameter) stored in the storage module:

```
R1 = (typical R/G)/(unit R/G);
B1 = (typical B/G)/(unit B/G);
G1 = (typical G/G)/(unit G/G) = 1;
If (R1 <1 || B1 <1)
{
If (R1 < B1)
Base_deviation = R1;
Else
Base_deviation = B1;
}
Else
Base_deviation = G1.
```

The driver IC 300 can obtain the base deviation between the first white balance imaging parameter and the second white balance imaging parameter by executing the code above.

In this embodiment, when the driver IC 300 performs the white balance compensation on the images collected by the photosensitive element 200, the driver IC 300 can perform the white balance compensation on the images collected by the photosensitive element 200 according to the calculated red-light intensity compensation value, blue-light intensity compensation value, and green-light intensity compensation value.

Specifically, the driver IC 300 calculates the red-light intensity compensation value, the blue-light intensity compensation value, and the green-light intensity compensation value according to following formulas:

red-light intensity compensation value=fourth ratio value/first ratio value/base deviation;

blue-light intensity compensation value=fifth ratio value/second ratio value/base deviation; and green-light intensity compensation value=sixth ratio value/third ratio value/base deviation.

Wherein, the aforesaid calculation process of the drive IC 300 can be executed by reading the following codes stored in the storage module:

```
R_GAIN = 0x100* (typical R/G)/(unit R/G)/ Base deviation;
B_GAIN = 0x100*(typical B/G)/(unit B/G)/ Base deviation;
G_GAIN = 0x100*(typical G/G)/(unit G/G)/ Base deviation.
```

In the formula, "0×100" is the preset ratio, which is expressed in hexadecimal here, that is, the preset ratio is 1. The driver IC 300 can obtain the red-light intensity compensation value (R_GAIN), the blue-light intensity compensation value (B_GAIN) and the green-light intensity compensation value (G_GAIN) by executing the code above.

Wherein, the driver IC 300 can compensate the red parameter, the blue parameter, and the green parameter of the preset image collected by the photosensitive element 200 by the red-light intensity compensation value, the blue-light intensity compensation value, and the green-light intensity compensation value, that is, in this embodiment, the white balance compensation is performed by adjusting the relationship between R, G, and B, so that the color parameters collected by the photosensitive element 200 of the display device are close to the color parameters of the preset images collected by the photosensitive element 200 of the typical display device under the preset light source, thereby realizing the white balance compensation of the photosensitive element of the display device.

The present disclosure further provides a white balance adjusting method of the photosensitive element of the aforesaid display device. Combined with that illustrated in FIG. 2, the display device includes the display panel 100, the photosensitive element 200 disposed on a side of the display panel 100, and the driver integrated circuit (IC) 300 electrically connected to the display panel 100 and the photosensitive element 200. Wherein, the white balance adjusting method of the photosensitive element 200 includes the following step:

performing a white balance compensation on image data collected by the photosensitive element of the display device according to a deviation between a first white balance imaging parameter of the photosensitive element of the display device and a second white balance imaging parameter of a photosensitive element of a preset typical display device by the driver IC.

Wherein, the first white balance imaging parameter is color parameters of a preset image collected by the photosensitive element of the display device under a preset light source.

The typical display device is a sample display device of a preset number of sample display devices selected from a batch of display devices, and the first white balance imaging parameter of the sample display device is within a preset threshold value of an average of all first white balance imaging parameters of the preset number of the sample display devices.

The second white balance imaging parameter is color parameters of a preset image collected by the photosensitive element of the typical display device under the preset light source.

In the embodiment, a value range of the preset threshold value is ±3% of the average value of all the first white balance imaging parameters of the preset number of the sample display devices, but it is not limited thereto, and the specific value range can be determined according to actual manufacturing process.

Wherein in the preset number of the sample display devices, when there are more than two sample display devices in which first white balance imaging parameters are within the preset threshold of the average value of all the first white balance imaging parameters of the preset number of the sample display devices, the typical display device is any one of the two or more of the sample display devices.

By the method mentioned above, the present disclosure allows to perform the white balance compensation on an entire batch of the photosensitive elements of the display device. Because the white balance compensation is performed after the photosensitive element is assembled on the display panel, the problem of poor white balance color consistency of the photosensitive elements incurred by the influence of the transmittance rates between individual screens can be solved.

The white balance adjusting method of the photosensitive element of the display device of this embodiment is described in detail as follow.

In this embodiment, the white balance adjustment is performed under a white light source. The white light can penetrate through the display panel to enter the photosensitive element. The photosensitive element of the display device can collect the color parameters of the preset image under the white light according to the first white balance imaging parameter. The color parameters include red parameters (R), green parameters (G), and blue parameters (B).

Figure 3:
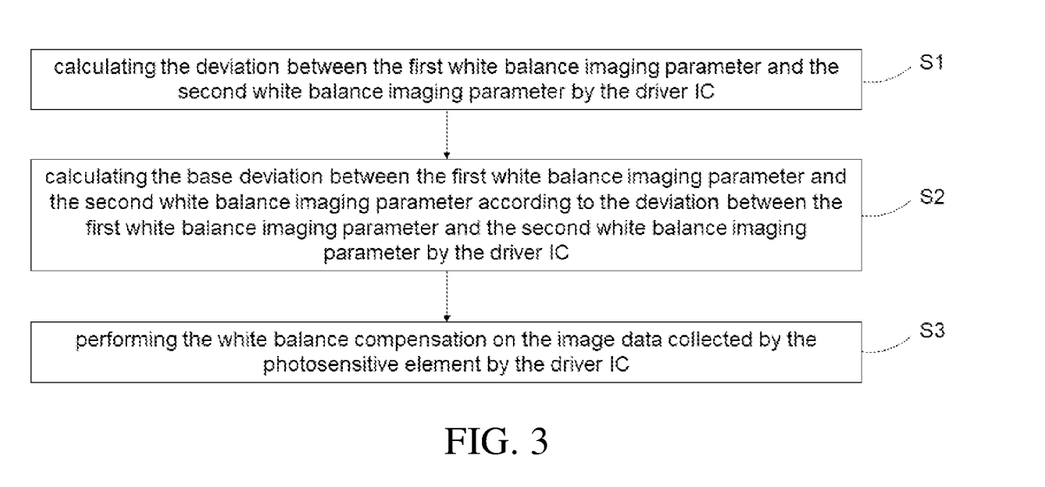
FIG. 3 is a flowchart of a white balance adjusting method of the display device provided by one embodiment of the present disclosure.

As illustrated in FIG. 3, the white balance adjusting method of the photosensitive element of the display device includes the following step:

Step S1, calculating the deviation between the first white balance imaging parameter and the second white balance imaging parameter by the driver IC.

Wherein, the deviation between the first white balance imaging parameter and the second white balance imaging parameter includes a first deviation between the red parameters, a second deviation between the blue parameters, and a third deviation between the green parameters.

Specifically, the driver IC calculates the deviation between the first white balance imaging parameter and the second white balance imaging parameter according to following formulas:

first deviation=fourth ratio value/first ratio value;
second deviation=fifth ratio value/the second ratio value; and
third deviation=sixth ratio value/third ratio value.

Wherein, the first white balance imaging parameter includes a ratio value of the red parameters to the green parameters (R/G value), a ratio value of the blue parameters to the green parameters (B/G value), and a ratio value of the green parameters to the green parameters (G/G value) of the preset image collected by the photosensitive element of the display device under the preset light source. The second white balance imaging parameter includes a R/G value, a B/G value, and a G/G value of the preset image collected by the photosensitive element of the typical display device under the preset light source.

Wherein, the ratio value of the red parameter to the green parameter, the ratio value of the blue parameter to the green parameter, and the ratio value of the green parameter to the green parameter of the preset image collected by the photosensitive element 200 of the display device under the preset light source are respectively a first ratio value, a second ratio value, and a third ratio value, and the ratio value of the red parameter to the green parameter, the ratio value of the blue parameter to the green parameter, and the ratio value of the green parameter to the green parameter of the preset image collected by the photosensitive element of the typical display device under the preset light source are respectively a fourth ratio value, a fifth ratio value, and a sixth ratio value.

Wherein, the photosensitive element 200 can collect the red parameters, the green parameters, and the blue parameters of the preset image under the white light source to obtain a corresponding image. The "parameter" herein can be a parameter that can characterize colors such as light intensity component. Wherein, the R/G value is a ratio of the red parameter to the green parameter of the preset image collected by the photosensitive element 200; the B/G value is a ratio of the blue parameter to the green parameter of the preset image collected by the photosensitive element 200; and the G/G value is a ratio of the green parameter to the green parameter of the preset image collected by the photosensitive element 200, that is, the G/G value is 1. In this embodiment, by the aforesaid above formula, the deviation between the color parameters of the preset images collected by the photosensitive element of the typical display device and the photosensitive element of the to-be-tested display device under the preset light source can be calculated.

Step S2: calculating the base deviation between the first white balance imaging parameter and the second white balance imaging parameter according to the deviation between the first white balance imaging parameter and the second white balance imaging parameter by the driver IC.

Wherein, the value of the third deviation is 1, and adopting 1 as the base deviation by the driver IC when at least one of the first deviation or the second deviation is greater than or equal to 1, or adopting a smallest one between the first deviation and the second deviation as the base deviation by the driver IC when the first deviation and the second deviation are less than 1. That is, the base deviation is a smallest value among the first deviation, the second deviation, and the third deviation.

Step S3: performing the white balance compensation on the image data collected by the photosensitive element by the driver IC.

Wherein, the driver IC is configured to perform white balance compensation on images collected by the photosensitive element according to a following formula: white balance compensation=second white balance imaging parameter/first white balance imaging parameter/base deviation between the first white balance imaging parameter and the second white balance imaging parameter.

Furthermore, the step of the driver IC performing the white balance compensation on the images collected by the photosensitive element of the display device includes:

calculating a red-light intensity compensation value, a blue-light intensity compensation value, and a green-light intensity compensation value and performing the white balance compensation on the images collected by the photosensitive element according to the red-light intensity compensation value, the blue-light intensity compensation value, and the green-light intensity compensation value by the driver IC.

Wherein, the driver IC calculates the red-light intensity compensation value, the blue-light intensity compensation value, and the green-light intensity compensation value according to following formulas:

red-light intensity compensation value=fourth ratio value/first ratio value/base deviation;

blue-light intensity compensation value=fifth ratio value/second ratio value/base deviation; and green-light intensity compensation value=sixth ratio value/third ratio value/base deviation.

Wherein, the driver IC can compensate the red parameter, the blue parameter, and the green parameter of the preset image collected by the photosensitive element through the red-light intensity compensation value, the blue-light intensity compensation value, and the green-light intensity compensation value, that is, in this embodiment, the white balance compensation is performed by adjusting the relationship between R, G, and B, so that the color parameters collected by the photosensitive element of the display device are close to the color parameters of the preset images collected by the photosensitive element 200 of the typical display device under the preset light source, thereby realizing the white balance compensation of the photosensitive element of the display device.

Figure 4:
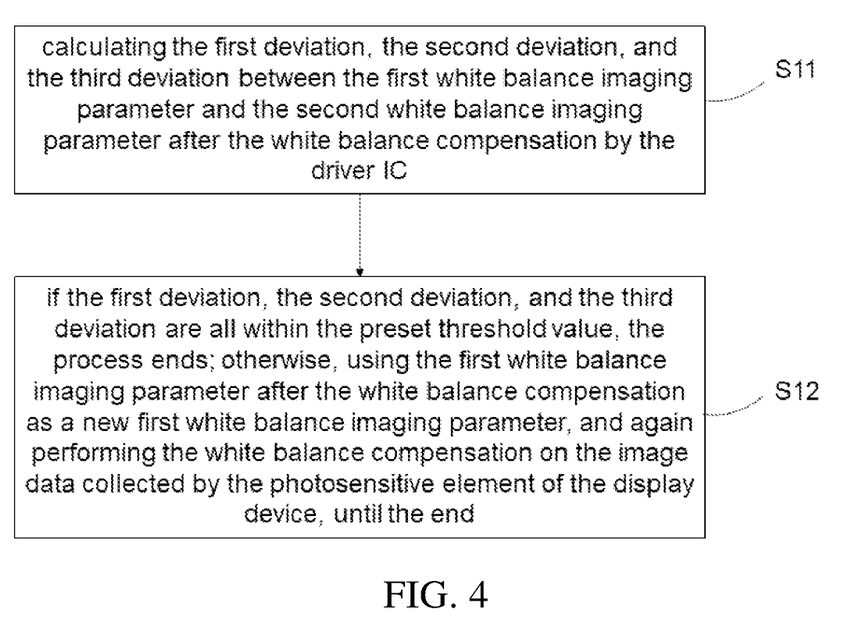
FIG. 4 is a flowchart of a method for product management and control of a photosensitive element of the display device provided by one embodiment of the present disclosure after adjustment of the white balance.

After adjusting the white balance of the photosensitive element of the display device of the present disclosure, the product after the white balance adjustment can also be managed and controlled, and as illustrated in FIG. 4, the specific method of management and control includes the following steps:

Step S11: calculating the first deviation, the second deviation, and the third deviation between the first white balance imaging parameter and the second white balance imaging parameter after the white balance compensation by the driver IC.

Step S12: if the first deviation, the second deviation, and the third deviation are all within the preset threshold value, the process ends; otherwise, using the first white balance imaging parameter after the white balance compensation as a new first white balance imaging parameter, and again performing the white balance compensation on the image data collected by the photosensitive element of the display device, until the end.

Wherein, a value range of the preset threshold value is ±3% of the average value of all the first white balance imaging parameters of the preset number of the sample display devices, but it is not limited thereto, and the specific value range can be determined according to actual manufacturing process. If the first deviation, the second deviation, and the third deviation are within the preset threshold value, it means that the white balance color consistency of the photosensitive element of the display device is good, and the display device is a qualified product. Otherwise, the color consistency of the white balance of the photosensitive element of the display device is poor, and white balance compensation needs to be performed again on the image data collected by the photosensitive element of the display device.

Figure 5:
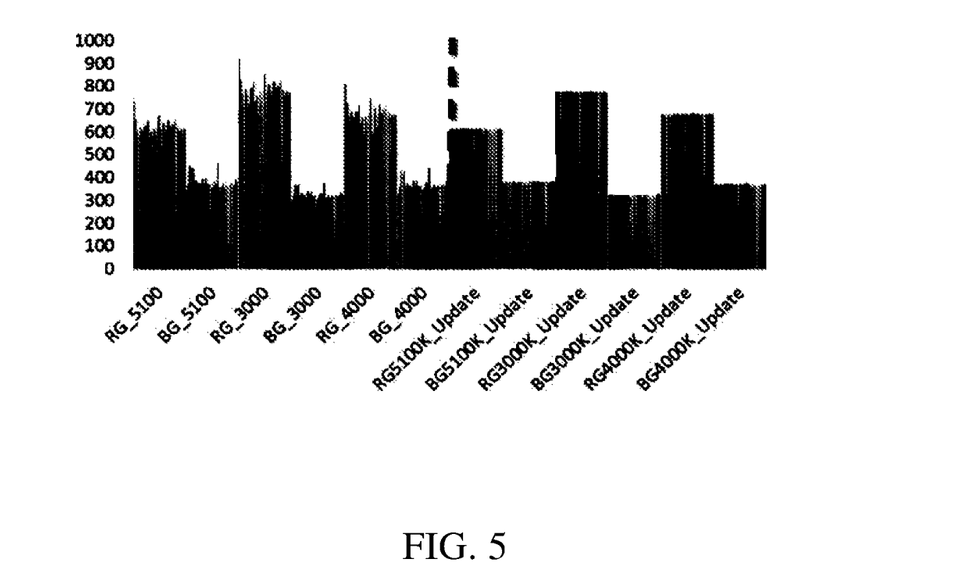
FIG. 5 is a comparison chart of photosensitive effects of the under-screen photosensitive element before and after the adjustment of the white balance.

As illustrated in FIG. 5, a left side of a dotted line in the drawing is a distribution diagram of a photosensitive value of the photosensitive element before adjusting the white balance, and a right side of the dotted line is a distribution diagram of the photosensitive value of the photosensitive element after adjusting the white balance. Before adjusting the white balance, the R/G value and B/G value of the preset image collected by the photosensitive element of the to-be-tested display devices in a same batch under the preset light source have a large fluctuation range, distributions of the values are discrete, and the color consistency of the white balance of the under-screen photosensitive element is poor. After adjusting the white balance, the R/G value and B/G value of the preset image collected by the photosensitive elements of the to-be-tested display devices in the same batch under the preset light source have a small fluctuation range, the distributions of the values are convergent, and the color consistency of the white balance of the under-screen photosensitive element is good.

In the present disclosure, the driver IC performs the white balance compensation on the image data collected by the photosensitive element of the display device according to the deviation between the first white balance imaging parameter of the photosensitive element in the display device and the second white balance imaging parameter of the photosensitive element of the typical display device after assembling the photosensitive element and the display panel. Wherein, the first white balance imaging parameter is color parameters of a preset image collected by the photosensitive element of the display device under a preset light source, the typical display device is a sample display device of a preset number of sample display devices selected from a batch of display devices, and the first white balance imaging parameter of the sample display device is within a preset threshold value of an average of all first white balance imaging parameters of the preset number of the sample display devices, and the second white balance imaging parameter is color parameters of a preset image collected by the photosensitive element of the typical display device under the preset light source. By the method mentioned above, the present disclosure allows to perform the white balance compensation on an entire batch of the photosensitive elements assembled in the display device, thereby solving the problem of poor white balance color consistency incurred by disposing the photosensitive under the screen in the prior art.

The display device and the white balance adjusting method of the photosensitive element of the display device provided by the embodiments of the present disclosure are described in detail. This article uses specific cases for describing the principles and the embodiments of the present disclosure, and the description of the embodiments mentioned above is only for helping to understand the method and the core idea of the present disclosure. Meanwhile, for those skilled in the art, will have various changes in specific embodiments and application scopes according to the idea of the present disclosure. In summary, the content of the specification should not be understood as limit to the present disclosure.

What is claimed is:

1. A display device, comprising a display panel which comprises a photosensitive region, a photosensitive element disposed on a side of the display panel and disposed corresponding to the photosensitive region, and a driver integrated circuit (IC) electrically connected to the display panel and the photosensitive element;
   wherein the driver IC is configured to perform a white balance compensation on image data collected by the photosensitive element of the display device according to a deviation between a first white balance imaging parameter of the photosensitive element of the display device and a second white balance imaging parameter of a photosensitive element of a preset typical display device being preset;
   the first white balance imaging parameter is color parameters of a preset image collected by the photosensitive element of the display device under a preset light source;
   the typical display device is one sample display device of a preset number of sample display devices selected from a batch of display devices, and a first white balance imaging parameter of the typical display is within a preset threshold value of an average of all first white balance imaging parameters of the preset number of the sample display devices; and
   the second white balance imaging parameter is color parameters of a preset image collected by the photosensitive element of the typical display device under the preset light source.

2. The display device as claimed in claim 1, wherein
   the driver IC is configured to perform the white balance compensation on the image data collected by the photosensitive element according to a following formula:
   the white balance compensation =the second white balance imaging parameter/the first white balance imaging parameter/a base deviation between the first white balance imaging parameter and the second white balance imaging parameter.

3. The display device as claimed in claim 2, wherein the color parameters comprise red parameters, green parameters, and blue parameters, the deviation between the first white balance imaging parameter and the second white balance imaging parameter comprises a first deviation between the red parameters, a second deviation between the blue parameters, and a third deviation between the green parameters, and the base deviation is a smallest value among the first deviation, the second deviation, and the third deviation.

4. The display device as claimed in claim 3, wherein the first white balance imaging parameter comprises: a first ratio value of the red parameters to the green parameters, a second ratio value of the blue parameters to the green parameters, and a third ratio value of the green parameters to the green parameters of the preset image collected by the photosensitive element of the display device under the preset light source; and
   the second white balance imaging parameter comprises: a fourth ratio value of the red parameters to the green parameters, a fifth ratio value of the blue parameters to the green parameters, and a sixth ratio value of the green parameters to the green parameters of the preset image collected by the photosensitive element of the typical display device under the preset light source.

5. The display device as claimed in claim 4, wherein the driver IC is configured to calculate the deviation between the first white balance imaging parameter and the second white balance imaging parameter according to following formulas:
   the first deviation =the fourth ratio value/the first ratio value;
   the second deviation =the fifth ratio value divided/the second ratio value; and
   the third deviation =the sixth ratio value/the third ratio value.

6. The display device as claimed in claim 5, wherein a value of the third deviation is
   the driver IC is configured to adopt 1 as the base deviation when at least one of the first deviation or the second deviation is greater than or equal to 1; or
   the driver IC is configured to adopt a smallest one between the first deviation and the second deviation as the base deviation when the first deviation and the second deviation are less than 1.

7. The display device as claimed in claim 6, wherein the driver IC is configured to perform the white balance compensation on the image data collected by the photosensitive element according to a red-light intensity compensation value, a blue-light intensity compensation value, and a green-light intensity compensation value, and wherein the driver IC is configured to calculate the red-light intensity compensation value, the blue-light intensity compensation value, and the green-light intensity compensation value according to following formulas:
   the red-light intensity compensation value=the fourth ratio value/the first ratio value/the base deviation;
   the blue-light intensity compensation value=the fifth ratio value/the second ratio value/the base deviation; and the green-light intensity compensation value=the sixth ratio value/the third ratio value/the base deviation.

8. The display device as claimed in claim 1, wherein the display device comprises a storage module, and the storage module is electrically connected to the driver IC and is configured to store the second white balance imaging parameter of the photosensitive element of the preset typical display device and the first white balance imaging parameter of the photosensitive element of the display device.

9. The display device as claimed in claim 1, wherein a value range of the preset threshold value is ±3% of the average value of all the first white balance imaging parameters of the preset number of the sample display devices.

10. The display device as claimed in claim 1, wherein in the preset number of the sample display devices, when there are more than two sample display devices in which the first white balance imaging parameters are within the preset threshold of the average value of all the first white balance imaging parameters of the preset number of the sample display devices, the typical display device is any one of the two or more of the sample display devices.

11. A white balance adjusting method of a photosensitive element of a display device, wherein the display device comprises a display panel which comprises a photosensitive region, the photosensitive element disposed on a side of the display panel and disposed corresponding to the photosensitive region, and a driver integrated circuit (IC) electrically connected to the display panel and the photosensitive element; wherein the white balance adjusting method of the photosensitive element comprises following steps:
obtaining a first white balance imaging parameter which is color parameters of a preset image collected by the photosensitive element of the display device under a preset light source by the driver IC;
obtaining a second white balance imaging parameter which is color parameters of a preset image collected by a photosensitive element of a typical display device under the preset light source by the driver IC, the typical display device is a sample display device of a preset number of sample display devices selected from a batch of display devices, and a first white balance imaging parameter of the sample display device is within a preset threshold value of an average of all first white balance imaging parameters of the preset number of the sample display devices; and
performing a white balance compensation on image data collected by the photosensitive element of the display device according to a deviation between the first white balance imaging parameter of the photosensitive element of the display device and the second white balance imaging parameter of the photosensitive element of the preset typical display device being preset by the driver IC.

12. The white balance adjusting method of the photosensitive element of the display device as claimed in claim 11, wherein the driver IC is configured to perform the white balance compensation on the image data collected by the photosensitive element according to a following formula: the white balance compensation =the second white balance imaging parameter/the first white balance imaging parameter/a base deviation between the first white balance imaging parameter and the second white balance imaging parameter.

13. The white balance adjusting method of the photosensitive element of the display device as claimed in claim 12, wherein the color parameters comprise red parameters, green parameters, and blue parameters, the deviation between the first white balance imaging parameter and the second white balance imaging parameter comprises a first deviation between the red parameters, a second deviation between the blue parameters, and a third deviation between the green parameters, and the base deviation is a smallest value among the first deviation, the second deviation, and the third deviation.

14. The white balance adjusting method of the photosensitive element of the display device as claimed in claim 13, wherein the first white balance imaging parameter comprises a first ratio value of the red parameters to the green parameters, a second ratio value of the blue parameters to the green parameters, and a third ratio value of the green parameters to the green parameters of the preset image collected by the photosensitive element of the display device under the preset light source; and
the second white balance imaging parameter comprises a fourth ratio value of the red parameters to the green parameters, a fifth ratio value of the blue parameters to the green parameters, and a sixth ratio value of the green parameters to the green parameters of the preset image collected by the photosensitive element of the typical display device under the preset light source.

15. The white balance adjusting method of the photosensitive element of the display device as claimed in claim 14, wherein before performing the white balance compensation on the image data collected by the photosensitive element by the driver IC, the white balance adjusting method of the photosensitive element of the display device comprises a following step:
calculating the deviation between the first white balance imaging parameter and the second white balance imaging parameter by the driver IC according to following formulas:
the first deviation =the fourth ratio value/the first ratio value;
the second deviation =the fifth ratio value/the second ratio value; and
the third deviation =the sixth ratio value/the third ratio value.

16. The white balance adjusting method of the photosensitive element of the display device as claimed in claim 15, wherein a value of the third deviation is 1, before performing the white balance compensation on the image data collected by the photosensitive element the driver IC and after calculating the first deviation, the second deviation, and the third deviation by the driver IC, the white balance adjusting method of the photosensitive element of the display device comprises a following step:
adopting 1 as the base deviation by the driver IC when at least one of the first deviation or the second deviation is greater than or equal to 1, or adopting a smallest one between the first deviation and the second deviation as the base deviation by the driver IC when the first deviation and the second deviation are less than 1.

17. The white balance adjusting method of the photosensitive element of the display device as claimed in claim 16, wherein the step of performing the white balance compensation on the image data collected by the photosensitive element by the driver IC comprises:
calculating a red-light intensity compensation value, a blue-light intensity compensation value, and a green-light intensity compensation value and performing the white balance compensation on the image data collected by the photosensitive element according to the red-light intensity compensation value, the blue-light intensity compensation value, and the green-light intensity compensation value by the driver IC.

18. The white balance adjusting method of the photosensitive element of the display device as claimed in claim 17, wherein the step of calculating the red-light intensity compensation value, the blue-light intensity compensation value, and the green-light intensity compensation value by the driver IC comprises: calculating the red-light intensity compensation value, the blue-light intensity compensation value, and the green-light intensity compensation value by the driver IC according to following formulas:

the red-light intensity compensation value=the fourth ratio value/the first ratio value/the base deviation;

the blue-light intensity compensation value=the fifth ratio value/ the second ratio value/the base deviation; and the green-light intensity compensation value=the sixth ratio value/ the third ratio value/the base deviation.

19. The white balance adjusting method of the photosensitive element of the display device as claimed in claim 11, wherein a value range of the preset threshold value is ±3% of the average value of all the first white balance imaging parameters of the preset number of the sample display devices.

20. The white balance adjusting method of the photosensitive element of the display device as claimed in claim 11, wherein in the preset number of the sample display devices, when there are more than two sample display devices in which the first white balance imaging parameters are within the preset threshold of the average value of all the first white balance imaging parameters of the preset number of the sample display devices, the typical display device is any one of the two or more of the sample display devices.

\* \* \* \* \*